United States Patent [19]

Schneider et al.

[11] 4,399,350
[45] Aug. 16, 1983

[54] PROCEDURE FOR THE THERMAL TREATMENT OF POWDERED AND GRANULATED CATALYSTS AND THE LIKE

[75] Inventors: Michael Schneider, Ottobrunn-Riemerling; Karl Kochloefl, Moosburg; Gerhard Diez, Munich; Franz Maier, Bruckmühl-Heufeld; Josef E. Rauch; Wolfgang Liebelt, both of Moosburg, all of Fed. Rep. of Germany

[73] Assignee: Süd-Chemie A.G., Munich, Fed. Rep. of Germany

[21] Appl. No.: 273,197

[22] Filed: Aug. 21, 1981

[30] Foreign Application Priority Data

Jun. 13, 1980 [DE] Fed. Rep. of Germany ....... 3022330

[51] Int. Cl.³ .............................................. F27B 9/06
[52] U.S. Cl. ..................................... 219/388; 34/164; 99/451; 366/127; 432/134
[58] Field of Search .................. 219/388, 400; 99/335, 99/443 E, 451; 165/169, 84, 120; 34/57 R, 142, 164; 106/40 R; 366/124, 127; 423/279; 432/134

[56] References Cited

U.S. PATENT DOCUMENTS

| 3,433,468 | 3/1969 | Schoenlaub | 34/164 X |
| 3,701,670 | 10/1972 | Pierce | 219/388 X |
| 3,703,861 | 11/1972 | Slack et al. | 99/443 C |
| 3,827,159 | 8/1974 | Vananzetti | 34/164 |
| 4,048,472 | 9/1977 | Sauer | 219/388 |
| 4,094,630 | 6/1978 | Turner | 432/134 |

FOREIGN PATENT DOCUMENTS 2403998 7/1975 Fed. Rep. of Germany .

Primary Examiner—Volodymyr Y. Mayewsky
Attorney, Agent, or Firm—Wm. R. Price

[57] ABSTRACT

Process for the thermal treatment of powdered and granulated catalysts, catalyst intermediate products, and inorganic substances, which are usable as constituents of catalysts or as auxiliary agents for the production of catalysts. The known process material is placed on a heated vibrating conveyor and there, in the form of a thin layer, in which the particles of the process material are moved with a larger horizontal and a smaller vertical component, heated and allowed to cool either outside the vibrating conveyor or in a separate vibrating conveyor or in the outlet portion of the first vibrating conveyor.

14 Claims, 1 Drawing Figure

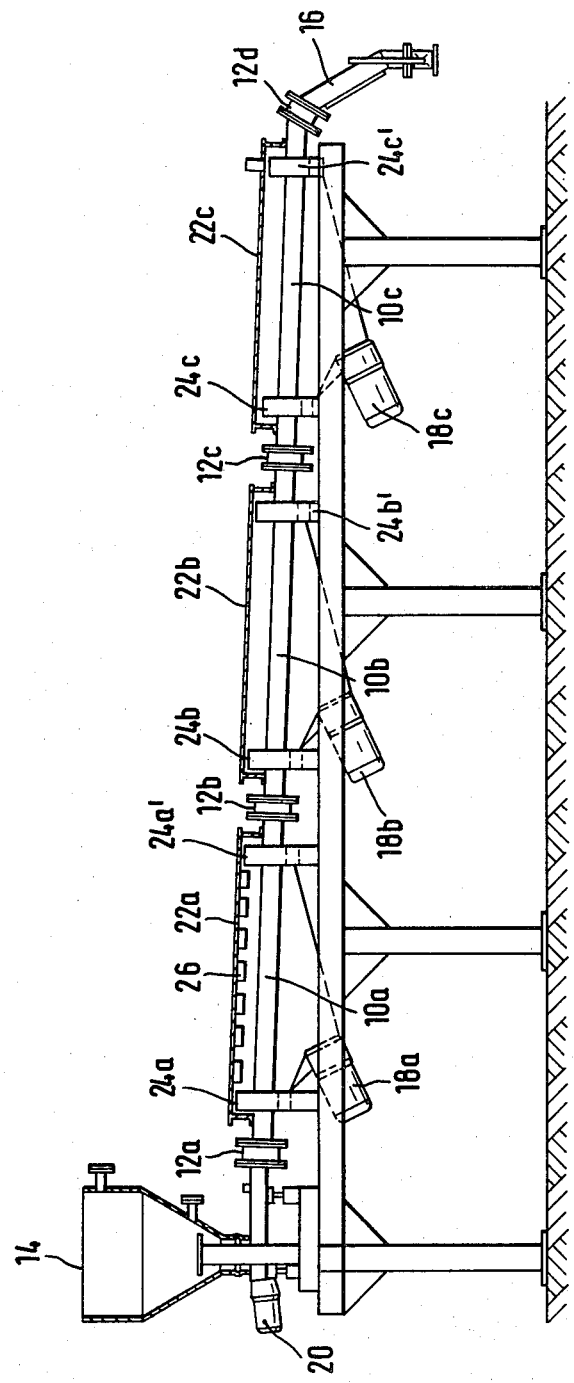

PROCEDURE FOR THE THERMAL TREATMENT OF POWDERED AND GRANULATED CATALYSTS AND THE LIKE

BACKGROUND OF THE INVENTION

The invention relates to a procedure for the thermal treatment of powdered and granulated catalysts, catalyst intermediate products, and inorganic substances that are usable as constituents of catalysts or as auxiliary agents for the production of catalysts.

FIELD OF THE INVENTION

Solid catalysts, either final or intermediate products, are subject to a thermal process in most cases during the manufacturing operation to develop full efficiency. Thus, there are, for example, many oxide catalysts that are subjected to a thermal process; being derived from compounds such as hydroxides, carbonates, nitrates, etc.

The catalytic efficiency of these catalysts is above all dependent on their chemical compositions, their surface properties, and their x-ray diffraction patterns. If the thermal process is incomplete, only a partial conversion of the precursor to the catalytically efficient material results. With a stronger thermal influence or overheating of the thermally treated materials, the optimal surface properties or the desired x-ray diffraction pattern or phase composition is not reached, whereby the catalytic efficiency of these oxides is also unsatisfactory.

It is therefore of great importance to direct the thermal influence on the catalyst precursor, so that an optimal degree of calcination is reached and so that all particles of the catalyst precursor undergo the identical thermal treatment.

It follows that the thermal treatment of catalysts in variously constructed furnaces is such that the stated purpose of an exactly controlled thermal treatment cannot, or can only incompletely, be reached.

DESCRIPTION OF THE PRIOR ART

With the so-called rack ovens, the racks or plates are loaded with the catalyst precursor, and this undergoes the thermal treatment mostly in direct contact with combustible gases. The layer thickness of the catalyst material on the plate amounts to, for economical reasons, several centimeters, often up to 5-6 cm. Thus, it is inevitable that the particles of the process material, which are found on the surface, edges, and corners of the plates, reach a desired degree of calcination faster than those found in the interior portion, so that a symmetrical calcination of all the parts is not possible. Furthermore, the energy distribution over the individual plates cannot be controlled symmetrically. The process material lyng on the highest and lowest plates in the rack is calcined sooner than that lying on the middle plates.

Belt ovens offer similar disadvantages for powdered material. Perforated belts are not usable for obvious reasons. For economical reasons one depends on a certain minimum layer thickness of the material on the belt. The portions contained on the surface of the layer are long overheated because of the thermal insulation in the layer at the point of optimal calcination of the portions in the interior.

With directly heated revolving ovens, no symmetrical material transport is possible, as is well known. Thus, the portions each migrate through the oven with characteristic duration times according to the grain size distribution and the drainage of waste. An asymmetrical thermal treatment results. Indirectly heated revolving ovens are used, when direct contact of the process material with the heating gas is undesirable. The disadvantage of these ovens lies in that it leads here to the overheating of the hot walls touching the material and to an undercalcining of the remaining material.

The described disadvantages have been eliminated by drying and calcining systems which treat the materials in a whirlpool layer. The discrete solid particles are thereby maintained in suspension in the gaseous heating medium. With such equipment systems the symmetrical thermal treatment is reached much sooner; however, these systems have the disadvantage of relatively high investment costs, since they require complicated construction features and above all the extraction of the finely divided solid particulate material out of the gas stream which presents difficulties. Further, abrasion-resistant materials are not cut into small pieces, so that as an additional disadvantage, an undesired particle size distributions are often obtained.

DE-OS No. 24 03 998 describes a procedure and a device for the carrying out of reactions between powdered and gaseous materials, especially a calcination and reduction device for the production of catalysts, that in principle requires that the catalyst precursor runs through a perpendicularly arranged, vibrating closed helix from top to bottom and thereby is carried by means of some reduction gases flowing countercurrently to the catalyst precursor. Energy is supplied through electrical heating elements that are located under the helix.

Although a very good catalyst quality is reached through the symmetrical thermal treatment of the catalyst particles and the symmetrical influence of the reduction gases, these devices have the distinct disadvantage that they considerably increase the production costs of the catalysts through the complicated construction features on one hand and the low product flow rate on the other hand or, conversely lead to inferior products if the flow rate is increased.

This can have different causes, for example, different path lengths of the particles in and out of the helix, the difficulty of constructing a helix very precisely with a complex geometric form, different flow rates of the particles as a function of different grain sizes or as a result of the conversion of catalyst precursors into the oxidized or reduced form.

Thus, for example, it can be observed through sight glasses that the process material occupies only a small part of the helix surface and this process material essentially runs down over the middle of the helix.

SUMMARY OF THE INVENTION

The present invention is based upon the elimination of the disadvantages, hereinbefore described while obtaining a symmetrical thermal treatment of materials in a simple and fast method.

Consequently, the subject of the invention is characterized in that the process material is placed on a heated vibrating trough conveyor, in the form of a thin layer in which the particles of the process material are moved in a harmonic motion having a larger horizontal and a smaller vertical component, and thereafter heated and allowed to cool either outside the vibrating conveyor or in a separate vibrating conveyor or in the outlet portion of the first vibrating conveyor.

BRIEF DESCRIPTION OF THE DRAWING

The drawing is a side elevation illustrating the vibrating conveyor of this invention, as well as the heating and ventilating elements for heat treatment and various other gaseous operations which can be employed during the treatment of the catalyst on the conveyor.

DESCRIPTION OF THE PREFERRED EMBODIMENT

The thermal process is preferably carried out in a horizontal or with a slight slope to the horizontal, linearly arranged vibrating conveyor. Hereby the process material is allowed to run through the vibrating conveyor in a closed, symmetrically thick layer. The thickness of the layer can lie between the diameter of a particle of the process material to about 20 mm. The layer thickness suitably lies between about 1 and 6 mm, preferably between about 2 and 4 mm.

The thermal process can continue in one or more vibrating conveyors, whereby the process material is heated from above by radiant heat during its passage through the vibrating conveyor(s). In general electrically heated radiant elements are used for this purpose. These are generally present in greater number at the inlet portion of the vibrating conveyor. By the latter part of the thermal process the process material no longer needs to be heated so strongly, unless endothermic reactions take place in the thermal process.

The movement of the process material in the vibrating conveyor(s) can be controlled in different ways, for an example, through the control of the duration time, it can be influenced by the regulation of the feed quantity. Moreover, the movement of the process material can be controlled through the variation of the vibration frequency and the vibration amplitude. For this purpose the amplitude direction can also be varied, in the angle of the force-locking vibrators connecting with the vibrating conveyor.

With the help of measures indicated by the invention, different layer thicknesses allow for a higher proportion to be maintained constant over the same surface of the vibrating conveyor. Thereby a symmetrical heating influence takes place on all the particles of the fine-particled process material; this is not only accomplished through the same duration time and a low layer thickness, but also through the vibration of the process material with a larger horizontal component and a smaller vertical component; the latter brings about that the vertical position of a single particle in the layer changes constantly. Through the vibration the heat is transferred deep inside the layer. All these measures result in that in spite of the low layer thickness a considerable quantity throughput of process material per unit of time can be obtained.

The wattage introduced to the vibrating conveyor can be put in variably, which depends on the kind of process material, the layer thickness, and the throughput velocity. The temperature is suitably regulated by means of a calibrated thermometer near the process material. Therefore, thermocouple elements are preferably used, which are arranged either in the bottom or above the bottom of the vibrating conveyor and that make possible an accurate determination of the temperature of the process material, that the radiant heat in general causes from above through the process material.

Depending on the kind of process material, different variations of the procedure considered in the invention are possible. When, for example, exothermic reactions occur because of the thermal treatment, it is suitable to cool in the first vibrating conveyor, especially at the outlet end, which can preferably happen through the introduction of gases through the bottom of the vibrating conveyor. In the other hand, it sometimes can be necessary in the case of the occurrence of endothermic reactions to heat the process material over the same vibrating conveyor or one or more heated vibrating conveyors connected at the outlet side. Thereby the wattage as well as the conveying speed can be regulated in every individual conveyor.

Depending on the process material the thermal process can be carried out in different atmospheres. In the simplest case the thermal process is carried out in the presence of air. When it is a case of an oxygen-sensitive process material, the thermal process is carried out in a protective gas atmosphere, preferably in the presence of nitrogen, $CO_2$, or noble gases.

In some cases the thermal process also comprises a reduction process, for example, when oxide catalysts are activated through reduction to their corresponding metals. In this case the thermal process is carried out in the presence of reduction gases, preferably in the presence of hydrogen, carbon monoxide, or mixtures of these gases.

Especially in the last case it is suitable to seal the vibrating conveyor against the outside atmosphere.

In some cases the catalytic active metals obtained through reduction are pyrophoric, i.e. they can ignite spontaneously in the air after the cooling of the process material. In these cases it is suitable to cover the catalytic active metals with a thin protective layer in a vibrating conveyor through chemisorption of gaseous oxidation means, preferably of atmospheric oxygen; admitted at the outlet end of the vibrating conveyor in which the reduction is carried out. This occurs in general, when the reduced and in some cases, cooled metal catalysts is maintained in a protective gas atmospheric, to which atmospheric oxygen is gradually introduced in increasing concentrations. If the catalyst is immediately exposed to the air after reduction, then the risk of spontaneous combustion is introduced.

A special advantage of the procedure described in the invention exists in that with the help of the vibrating conveyor powdered products can be produced with fairly accurately limited specific surface area.

The procedure described in the invention is hereafter illustrated with the aid of the drawing.

The drawing shows schematically a closed apparatus with three vibrating conveyors 10a, b, and c, that are connected with one another through the elastic sleeve collars 12a, b, c, and d or one one end with a funnel tube 14 and on the other end with an outlet pipe 16. The slightly inclined vibrating conveyors 10a–c are moved to vibration through the vibrators 18a–c. The direction of the vibrators runs through the bottom of the vibrating conveyor in a sharp angle, so that the particles, which are contained in a layer of the process material in the vibrating conveyor, are moved with a larger horizontal and a smaller vertical component. The particles hop, so to speak, on the vibrating conveyor, whereby they gradually move from left to right. The flow rate of the process material can be varied with, for example, the help of a pushing screw (not shown) through the motor 20.

The vibrating conveyors 10a–c are closed by the covers 22a–22c, which are stationary, fastened on the mountings 24a–c or 24a'–24c'. Since the vibrating conveyors are movable relative to the covers 22a–c, it is suitable to provide for a small air slit for releasing or to provide for the operation in a protective gas atmosphere and to provide for elastic gasket elements (not shown between the vibrating conveyors 10a–c and the covers 22a–c.

The vibrating conveyor 10a serves in general as a heating zone for the process material. For this purpose more radiation heating elements are placed on cover 22a, through which the process material is heated from above. On the bottom or close to the bottom of the vibrating conveyor 10a are in general also found thermocouple elements (now shown) to measure the temperature of the process material and to regulate the wattage of the radiation heating elements 26 by means of suitable control equipment.

In general, the true thermal treatment results in the vibrating conveyor 10b, for example the calcination of the catalyst first step. For this purpose radiation heating elements (now shown) are placed likewise on cover 22b. The conveyor 10b can moreover be supplied already with equipment for the introduction of cooling gases, especially at the outlet end.

In general, however, the cooling of the process material results in the vibrating conveyor 10c, which in general contains no heating elements, having instead of course, cooling equipment. There can, for example, be provided in the bottom of the conveyor or in the cover 22c introduced pipes, through which a cooling medium flows. Preferably, however, a cooling gas is introduced and either through perforations in the bottom of the conveyor 10c or from above through the cover 22c or through the outlet pipe 16. The cooling gas can, for example, be a buffer gas to which is added a small quantity of air, which produces a thin protective oxide layer on the active metal catalyst obtained through reduction, before the catalyst is discharged into the atmosphere through the outlet pipe 16.

Every vibrating conveyor 10a–c or cover 22a–c can be individually provided with equipment for the supply and drain off of gases.

The thermal process includes physical and chemical processes, like drying and calcination or decomposition reactions, that take place under influence of heat or are thermally initiated. Furthermore, such processes are included that can run at higher temperatures (in general over 100° C.) in the solid phase and in the presence of a reducing or oxidizing atmosphere and can have an endothermic or an exothermic character (for example, a changing of the crystal structure). In many cases these processes run not separately, but simultaneously.

As an example, by the thermal treatment of the process material made according to the invention, there takes place above all the removal of the free, i.e. phsyically fixed waters at temperatures of about 100° C. (for example by activated carbon, molecular sieves, $SiO_2$). At a temperature over 100° C. inorganic hydrates are converted into waterfree substances. At higher temperatures dehydration through the condensation of OH groups can also take place (for example in the production of $Al_2O_3$, MgO, and $Fe_2O_3$ out of the corresponding hydroxides).

Thermal decomposition reactions take place, for example, with carbonates or basic carbonates, nitrates, and chromates of the transition metals as well as of the organic salts (oxalates, formates, etc.). Also the ammonium complexes and ammonium salts of the metals are decomposed thermally. All of these substances can exist either in pure form, in the form of mixtures, or placed on carriers (for example production of NiO, CuO, CoO, and $CuCr_2O_4$).

Moreover, reductive and oxidative conversion processes can take place. At higher temperatures and in reducing atmospheres (for example, $H_2$, CO) the oxides of the transition metals are converted into the corresponding elements. Under oxidative conditions (air, $O_2$) the conversion of transition metal sulfides to the corresponding metal oxides results, or an increase in the oxidation numbers of the oxidized compounds. Also, these materials can be considered in pure form, in mixtures, or attached to carriers. Examples are the reduction of NiO, CuO, CoO, $Fe_2O_3$, etc., the heating of $Mo^-$, $Zn^-$, $Cu^-$, and $Fe^-$ sulfides as well as the oxidative decomposition of dross containing $Mn^-$, $V^-$, and $W^-$.

The invention is illustrated by the following explanatory example.

EXAMPLE

A known catalyst precursor, namely a basic copper ammonium chromate decomposes thermally according to the following equation:

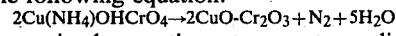

The optimal reaction temperature lies between 350°–450° C., whereby in the lower temperature range catalysts with higher specific surface area and better activity for the hydrogenation of carbonyl compounds are obtained, and in the higher temperature range catalysts with low specific surface areas are obtained, that are suitable for the hydrogenation of fatty acids and fatty acid methyl esters. The thermal decomposition proceeds exothermically therefore the reaction heat must be eliminated in a controlled manner for the realization of the desired specific properties of the copper chromite catalysts produced.

Under the use of the previously described apparatus, copper ammonium chromate was produced with a grain size of 40–120 μm at a material flow of 3 kg/std on the vibrating conveyor. It was operated under protective gas atmosphere (nitrogen with a flow rate of 4m³/std). The duration time of the charging materials amounted to 6 min. The thermal decomposition was accomplished at the temperatures given in the next table.

As a comparison the same basic copper ammonium chromate was heated slowly at 350° C. in a rack oven on metal plates in a layer thickness of about 5 mm. After the beginning of the decomposition reaction the temperature climbed to about 400°–420° C. and was stopped after about 30 min. at the final temperature of 400°–420° C. The specific surface areas ($O_s$ in m²/g) were determined by the BET-method; these are likewise given in the next table. The activities of the catalysts treated according to the invention and the comparison catalyst's were compared with each other. The velocity constant $k_1$ (mol/h catalyst) of the furfural hydrogenation (FAL-hydrogenation) at 150° C., a hydrogen pressure of 100 bar, and a catalyst content of 0.6 weight percent, relative to the furfural, were fixed; for the other was carried out a fatty acid methyl ester-hydrogenation (FSM-hydrogenation) at 250° C., a hydrogen pressure of 200 bar and a catalyst content of 2.0 weight percent, relative to the added FSM. The results are given in the next table.

| Decomposition temperature (°C.) | Sa (m²/g) | Activity $k_1$* (mol/h g catalyst) | |
|---|---|---|---|
| | | FAL-hydrogenation | FSM-hydrogenation |
| Invention catalyst | | | |
| 350 | 130 | 7.2 | −0.7 |
| 400 | 100 | 4.8 | −0.1 |
| 425 | 75 | 2.2 | −1.3 |
| 450 | 28 | 1.5 | −1.5 |
| 480 | 18 | 1.0 | −1.2 |
| Comparison catalyst | | | |
| 350–420 | 30 ± 5 | 0.8 ± 0.2 | −0.7 ± 0.3 |

*The negative values for $k_1$ refer to the reduction of the ester concentration.

The comparison of the values of the activity constants $k_1$ shows not only that at almost all levels of the vibrating conveyor higher activities of the catalysts are obtained, but it also shows that after the establishment of the optimal working conditions of the vibrating conveyor, catalytic calcination activities are obtained which are essentially higher than those of the catalysts thermally treated by the conventional method.

Relative to the economy, thermal decomposition with vibrating conveyors, utilizing a device with a length of about 7 m and a conveyor width of about 1 m, produces about 2,000 kg/day of copper chromite catalyst, a higher throughput than that of some spiral conveyors of similar dimensions.

We claim:

1. A process for the thermal treatment of powdered or granulated particles of catalytically related material, which comprises the steps of:
   A. feeding said material in a thin layer onto a reciprocating and vibrating trough conveyor;
   B. imparting a reciprocating and vibratory motion to said conveyor trough and to said powdered material on said trough;
      1. said reciprocating motion having a vertical component and a horizontal component and,
      2. said vertical component being smaller than said horizontal component so as to move said material along said conveyor,
   C. applying heat to the material moving in a harmonic and vibratory fashion along said conveyor trough;
   D. thereafter allowing said thermally treated particles to cool.
2. A process, as defined in claim 1, in which said heat is applied to the material moving in essentially a horizontal plane along said reciprocating and linearly arranged vibrating conveyor.
3. A process, as defined in claim 2, in which said material moves in a plane at a slight slope from the horizontal.
4. A process, as defined in claim 1, in which the thickness of said layer of powdered material is in a range of about the diameter of a single particle of said material to about 20 mm.
5. A process, as defined in claim 4, in which the thickness of said layer is in a range of from about 1–6 mm and preferably between about 2–4 mm.
6. A process, as defined in claim 1, in which said heat is applied through radiant heaters located above said vibrating conveyor.
7. A process, as defined in claim 1, the improvement of controlling the movement of the material through the conveyor which comprises the steps of:
   A. controlling the duration of time that the materials are on the conveyor;
   B. regulating the frequency of the vibration of said conveyor;
   C. regulating the vibrational amplitude; and
   D. regulating the amplitude direction.
8. A process, as defined in claim 1, the improvement of controlling the vibratory motion of the conveyor and of controlling the temperature at which said materials are treated on said conveyor which comprises:
   A. variably regulating the wattage input to the heating means for the conveyor; and
   B. regulating the amount of heat supplied to the material through the use of heating means responsive to a calibrated thermometer located near the material being treated.
9. A process, as defined in claim 1, the further improvement of introducing gases through the bottom of the vibrating conveyor to absorb the heat evolved through the exothermic reaction of material treated on said conveyor.
10. A process, as defined in claim 1, the improvement of introducing protective gas atmospheres into contact with the powdered materials.
11. A process, as defined in claim 10, in which said protective gas atmosphere comprises nitrogen, carbon dioxide, or one of the noble gases.
12. A process, as defined in claim 1, the improvement of introducing reducing gases into contact with the material moving in a harmonic vibratory motion along said conveyor.
13. A process, as defined in claim 12, in which said reducing gases comprises hydrogen or carbon monoxide.
14. A process, as defined in claim 12, which comprises the further steps of:
   A. flushing said reducing gases away from the reduced powdered materials;
   B. slowly adding a protective gas atmosphere to said treated powdered material;
   C. thereafter slowly adding an oxidizing gas to said protective gas atmosphere in gradually increasing concentration; and
   D. covering said reduced particles through chemisorption with a thin oxide protective coating.

* * * * *

UNITED STATES PATENT OFFICE
CERTIFICATE OF CORRECTION

PATENT NO. : 4,399,350

DATED : August 16, 1983

INVENTOR(S) : Schneider et al

It is certified that error appears in the above-identified patent and that said Letters Patent are hereby corrected as shown below:

Col. 2, line 21  Strike "an", second occurrence
Col. 3, line 25  Insert a comma after "In general"
Col. 4, line 10  Strike "In" and substitute with --On--
Col. 4, line 43  Correct the spelling of "gas atmosphere"
Col. 5, line 10  Complete parentheses around "not shown"
Col. 5, lines 18 and 25  Change "now" to --not--
Col. 6, line 52  Insert a comma after "comparison"
Col. 6, line 54  Change "mm" to --cm--
Col. 6, line 55  Place a comma after "reaction"
Col. 7, Table under "EXAMPLE" should correctly appear as follows:

UNITED STATES PATENT OFFICE
CERTIFICATE OF CORRECTION

PATENT NO. : 4,399,350

DATED : August 16, 1983

INVENTOR(S) : Schneider et al

It is certified that error appears in the above-identified patent and that said Letters Patent are hereby corrected as shown below:

| Decomposition temperature (°C) | $S_a$ ($m^2/g$) | Activity $k_1$* (mol/h g catalyst) | |
|---|---|---|---|
| Invention catalyst | | FAL-hydrogenation | FSM-hydrogenation |
| 350 | 130 | 7.2 | -0.7 |
| 400 | 100 | 4.8 | -0.1 |
| 425 | 75 | 2.2 | -1.3 |
| 450 | 28 | 1.5 | -1.5 |
| 480 | 18 | 1.0 | -1.2 |
| Comparison catalyst | | | |
| 350-420 | 30±5 | 0.8±0.2 | -0.7±0.3 |

*The negative values for $k_1$ refer to the reduction of the ester concentration.

Signed and Sealed this

Twenty-fifth Day of October 1983

[SEAL]

Attest:

GERALD J. MOSSINGHOFF

Attesting Officer    Commissioner of Patents and Trademarks